(No Model.)
C. F. PARKER.
MANUFACTURE OF INDIA RUBBER BOOTS.
No. 425,454. Patented Apr. 15, 1890.
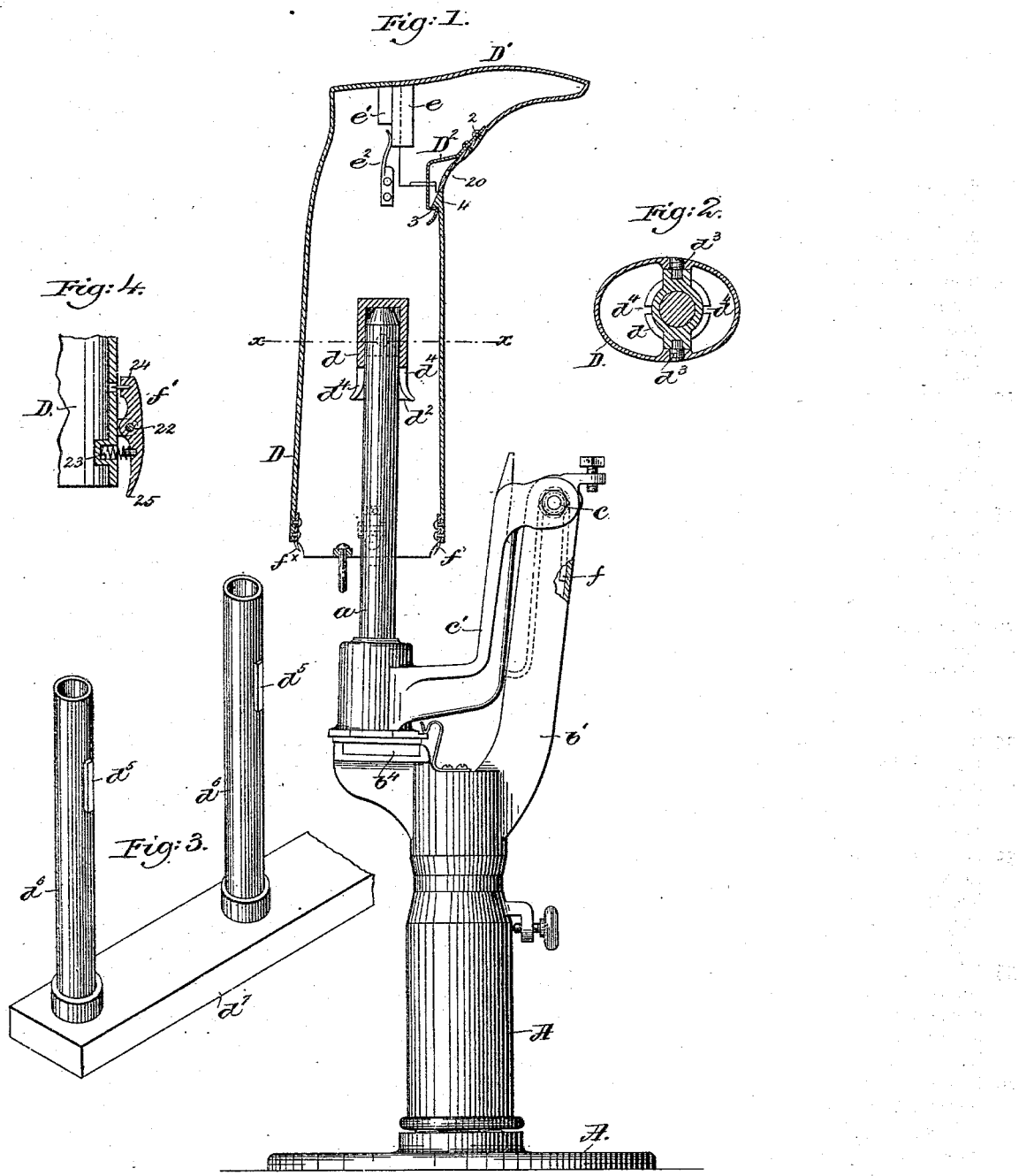
Witnesses.
Frederick L. Emery
Edgar A. Goddin
Inventor.
Charles F. Parker,
by Crosby & Gregory
Attys

UNITED STATES PATENT OFFICE.

CHARLES F. PARKER, OF WOLLASTON, MASSACHUSETTS.

MANUFACTURE OF INDIA-RUBBER BOOTS.

SPECIFICATION forming part of Letters Patent No. 425,454, dated April 15, 1890.

Application filed November 25, 1889. Serial No. 331,474. (No model.)

*To all whom it may concern:*

Be it known that I, CHARLES F. PARKER, of Wollaston, county of Norfolk, State of Massachusetts, have invented an Improvement in Mechanism for the Manufacture of India-Rubber Boots, of which the following description, in connection with the accompanying drawings, is a specification, like letters on the drawings representing like parts.

This invention has for its object the production of an improved tree more especially adapted for use in the manufacture of rubber boots.

In accordance with my invention a metal tree composed of a hollow shell-like leg and a hollow foot connected thereto is provided wtih a socket, loop, or eye which is adapted to fit and be rotated freely about a fixed standard shown as erected upon an arm pivoted to swing about a horizontal pivot in a bracket shown as capable of being revolved about a vertical post.

In this invention the tree may be readily detached from or applied to the said standard. The tree has at or near the end of the leg holding devices for the lining of the india-rubber boot. In order to fasten the foot to the leg of the tree, I have devised a spring-catch which is wholly concealed within the tree, the said catch being so shaped that it may yield and be disengaged from the leg of the tree by a sharp quick blow upon the instep of the foot.

Figure 1 in elevation represents a jack upon which is mounted my improved tree, the latter being represented in section. Fig. 2 is a section of Fig. 1 in the line $x$. Fig. 3 shows a support with pins thereon to hold the trees in a vulcanizing-oven, and Fig. 4 is a sectional detail taken through one of the lining-holders located at the side of the tree-leg.

Referring to the drawings, A represents a base; A', a post thereon; $b'$, a bracket swiveled on the said post and having a cushion $b^4$. $c'$ is an arm pivoted at $c$ upon the said bracket, and $f$ a spring so arranged as to partially counterbalance the weight of the arm $c'$ and enable it to be turned readily about the pivot $c$ when it is desired to place the tree with its leg in substantially horizontal position, such being done during part of the operation of applying to the tree the usual lining for the boot and applying the rubber compound to the said lining. The arm $c'$ has erected upon it a standard $a$, which receives upon it the sleeve $d$, fixed in the leg D of the tree, the said sleeve having, as shown, a flaring mouth $d^2$. The said sleeve is represented as held within the leg D of the tree by suitable screws $d^3$, (shown best in Fig. 2,) the flaring mouth of the sleeve aiding in the ready application of the sleeve to the top of the said standard. Preferably the top of the standard will be made conical to facilitate its entrance into the said sleeve.

The tree is composed of a hollow leg D and a hollow foot D', the latter having connected to it by suitable screws 2 a locking device or spring $D^2$, the latter being bent substantially as represented in Fig. 1, and being provided with a hook 3 to engage a shoulder 4 on the leg part when the foot is pushed into place upon the leg, as represented in Fig. 1.

If the foot of the tree should be provided with a hole at the point 20 for the passage through it of a pin or some other device by which to push back the locking device $D^2$ from the outside, then such contrivance would not have the merit due to the invention hereinbefore described, for the lining or the rubber compound would get into the hole and would make a spot or lump in the boot at that place, and so, also, any device exposed at the face of the tree and capable of being moved to disengage the catch would be liable to be detached while the operator was working the rubber compound into shape on the tree.

The foot D' has connected to or forming part of it usual dovetail projections $e$, which engage usual dovetail guideways $e'$, attached to or forming part of the leg D, the dovetail projections being inserted in the dovetail guideways by a movement of the foot in the direction of the arrow, Fig. 1, as when the foot is being put in working position. To compensate for any wear between the said projections and guideways, I have added to the leg springs $e^2$, which act upon the projections $e$, thus preventing any rattling or noise. The open end of the leg D has attached to it suitable lining-holders $f^*$ $f'$. (See Figs. 1 and 4.) The lining-holders $f^*$ consist of metal plates having points which are located in notches at the end of the leg, the said points being, preferably, bent inwardly, as represented in Fig. 1, in order that the lining of the boot to be made may be hooked over the said points, which act as tenter-hooks. The lining-holders $f'$ (shown as attached to the leg of the tree) are represented as levers pivoted at 22 between ears erected on the leg, each lever being normally acted upon at its rear end by a suitable spring 23, (shown set into a recess in the leg,) each lever having one or more pins 24 to extend through the lining of the boot when applied to the tree and to enter a hole in the leg. The latch-like lining-holder, made as a lever of the first order, may be readily operated to open the same by pressure against the end 25 of the lever in opposition to the spring 23. The holder $f'$ is fully and clearly shown in Fig. 4, Fig. 1 showing it in dotted lines back of the standard $a$ and leg D. These holders secure the lining in place while the rubber compound is being properly applied thereto and about the tree to give to the boot its proper shape.

I have shown the sleeve $d$ as provided with slots $d^4$, the said slots in practice fitting projections $d^5$ upon pins $d^6$, extended upwardly from the base $d^7$, the said base having any desired number of pins, being supposed to be set in a vulcanizing-oven after receiving trees such as represented in Fig. 1, the slots in the sleeves $d$ at such time engaging the projections $d^5$ upon the said pins, the trees remaining in the vulcanizing-oven until the boots have been properly vulcanized. The slots $d^4$, co-operating with the projections on the said pins, prevent any accidental rotation of the trees upon their supports during vulcanization, thus obviating the contacting of one boot with another, there being several located close together in the oven during vulcanization.

The boot having been properly vulcanized and the tree removed from the vulcanizing-oven, the boot must be removed from the said tree. To do this the lining at the open end of the leg of the boot will either be detached from the holding device or with a knife the leg may be cut around the tree close to the holding device, and then with a sharp blow upon the tree at the point 20, Fig. 1, by the hand or otherwise, the locking device will be disengaged and the foot may be readily detached from the tree, pulling off from the leg the leg of the boot, and thereafter the foot may be readily removed from the boot. With the tree and its foot constructed as hereinbefore described, it is possible to easily and quickly apply the lining and the rubber compound to the tree, and the latter is free to be rotated upon the standard $a$ during such operation, and the arm is free to be rotated about the pivot $c$, and the bracket $b'$ be turned about the post, so that the operator has complete control of the tree, enabling him to bring any portion of it uppermost to be readily under supervision.

I do not desire to limit my invention to the exact shape or construction of the sleeve or socket shown, and by the term "sleeve or socket" I mean any usual sleeve, socket, eye, ring, or loop capable of engaging the pin and permitting the tree to rotate thereon.

In United States patent heretofore granted to me, No. 360,242, the hollow leg had an ear provided with a square hole which fitted a square pin upon a revolving block; but in this my present invention the tree itself turns about a fixed standard inserted into the tree.

I claim—

1. A fixed standard $a$ and a metal tree consisting of a hollow leg and an attached foot, the leg having within it a hollow sleeve, socket, or eye to allow the leg to be placed on and revolve around the said standard, combined with attached lining-holders, to operate substantially as described.

2. The shell-like metallic leg D, having the guides $e'$, and the shell-like metallic foot $c'$, having the projections $e$, the projection 4, and the locking device $D^2$, combined with a spring $e^2$, to operate substantially as described.

3. The hollow metallic shell-like leg having a hollow sleeve secured therein, combined with the arm $c'$ and round fixed standard $a$, supported thereby and entering the said sleeve, the said round standard enabling the leg to rotate thereon, to operate substantially as described.

4. The hollow metallic shell-like leg and the sleeve $d$, having a notch $d^4$, combined with a standard $d^6$, having a projection, to operate substantially as and for the purpose set forth.

In testimony whereof I have signed my name to this specification in the presence of two subscribing witnesses.

CHARLES F. PARKER.

Witnesses:
GEO. W. GREGORY,
B. DEWAR.